(12) United States Patent
Ke

(10) Patent No.: US 9,906,138 B2
(45) Date of Patent: *Feb. 27, 2018

(54) FLYBACK-BASED POWER CONVERSION APPARATUS

(71) Applicant: Power Forest Technology Corporation, Hsinchu County (TW)

(72) Inventor: Po-Jen Ke, Taoyuan (TW)

(73) Assignee: Power Forest Technology Corporation, Hsinchu County (TW)

( * ) Notice: Subject to any disclaimer, the term of this patent is extended or adjusted under 35 U.S.C. 154(b) by 130 days.

This patent is subject to a terminal disclaimer.

(21) Appl. No.: 14/623,501

(22) Filed: Feb. 17, 2015

(65) Prior Publication Data

US 2016/0190936 A1 Jun. 30, 2016

(30) Foreign Application Priority Data

Dec. 24, 2014 (TW) .............................. 103145209 A

(51) Int. Cl.
*H02M 3/335* (2006.01)
*H02M 1/32* (2007.01)

(52) U.S. Cl.
CPC .......... *H02M 3/33507* (2013.01); *H02M 1/32* (2013.01)

(58) Field of Classification Search
CPC ............ H02H 7/1213; H02M 3/33507; H02M 3/33523; H02M 1/32
See application file for complete search history.

(56) References Cited

U.S. PATENT DOCUMENTS

| 9,077,176 | B2 * | 7/2015 | Ke ........................ H02H 7/1213 |
| 9,479,069 | B2 * | 10/2016 | Chen ........................ H02M 1/32 |
| 2013/0121044 | A1 * | 5/2013 | Gao .................. H02M 3/33523 363/50 |
| 2014/0016378 | A1 * | 1/2014 | Ke ........................ H02H 7/1213 363/21.18 |

FOREIGN PATENT DOCUMENTS

| CN | 101026341 | 8/2007 |
| CN | 102820764 | 12/2012 |
| CN | 103546035 | 1/2014 |
| TW | M387285 | 8/2010 |
| TW | 201206039 | 2/2012 |
| TW | 201344385 | 11/2013 |
| TW | 201404017 | 1/2014 |

* cited by examiner

*Primary Examiner* — Jue Zhang
(74) *Attorney, Agent, or Firm* — JCIPRNET

(57) ABSTRACT

A power conversion apparatus including a flyback power conversion circuit, a control chip and a detection auxiliary circuit is provided. The flyback power conversion circuit receives and converts an input voltage into a DC output voltage. The control chip generates a PWM signal in response to a power supplying requirement to control the operation of the flyback power conversion circuit, wherein the control chip has a single multi-function detection pin. The detection auxiliary circuit assists the control chip to obtain a first detection voltage via the multi-function detection pin, such that the control chip performs a detection of an over temperature protection (OTP) and a detection of an over voltage protection (OVP) synchronously according to the first detection voltage. The first detection voltage is related to the DC output voltage or a thermal voltage of an environment temperature.

15 Claims, 5 Drawing Sheets

FLYBACK-BASED POWER CONVERSION APPARATUS

CROSS-REFERENCE TO RELATED APPLICATION

This application claims the priority benefit of Taiwan application serial no. 103145209, filed on Dec. 24, 2014. The entirety of the above-mentioned patent application is hereby incorporated by reference herein and made a part of this specification.

BACKGROUND

Technical Field

The invention relates to a power conversion technique, and particularly relates to a flyback-based power conversion apparatus.

Related Art

A main application of power conversion apparatus is to convert an input voltage with a high voltage value and low stability that is provided by a power company into a direct current (DC) output voltage with a low voltage value and good stability that is suitable for various electronic devices. Therefore, the power conversion apparatus is widely applied in various electronic devices such as computers, office automation equipment, industrial control equipment and communication equipment, etc.

A control structure in today's power conversion apparatus generally adopts a pulse width modulation (PWM) control chip. Moreover, in order to avoid damage of the power conversion apparatus due to phenomenon of over temperature (OT), over voltage (OV), and over current (OC), etc., today's PWM control chip is generally configured with a plurality of independent detection pins to respectively execute/perform detection of over temperature protection (OTP) and detection of over voltage protection (OVP). In other words, a single detection pin of today's PWM control chip only corresponds to one kind of related detection function at most, so that a whole cost of the PWM control chip is eventually increased.

SUMMARY

The invention is directed to a flyback-based power conversion apparatus, by which the problem mentioned in the related art is resolved.

The invention provides a power conversion apparatus including a flyback power conversion circuit, a control chip and a detection auxiliary circuit. The flyback power conversion circuit receives an input voltage and converts the input voltage in response to a pulse width modulation (PWM) signal, so as to generate and provide a direct current (DC) output voltage. The control chip is coupled to the flyback power conversion circuit, and generates the PWM signal to control the operation of the flyback power conversion circuit in response to a power supplying requirement, where the control chip has a multi-function detection pin. The detection auxiliary circuit is coupled to the flyback power conversion circuit and the multi-function detection pin of the control chip. The detection auxiliary circuit assists the control chip to obtain a first detection voltage through the multi-function detection pin in a first detection phase, so as to perform a detection of an over temperature protection (OTP) and a detection of an over voltage protection (OVP) synchronously according to the first detection voltage. The first detection voltage is related to the DC output voltage or a thermal voltage of an environment temperature.

In an embodiment of the invention, in the power conversion apparatus, the control chip enters the first detection phase during a disable period of the PWM signal, and enters a second detection phase during an enable period of the PWM signal.

In an embodiment of the invention, in the power conversion apparatus, the flyback power conversion circuit includes a transformer, a power switch, a first resistor, a first diode, a first capacitor and a second diode. The transformer has a primary winding, a secondary winding and an auxiliary winding. A common-polarity terminal of the primary winding is configured to receive the input voltage. A common-polarity terminal of the auxiliary winding is coupled to a first ground terminal. A common-polarity terminal of the secondary winding is coupled to a second ground terminal. A first terminal of the power switch is coupled to an opposite-polarity terminal of the primary winding. A control terminal of the power switch is coupled to the control chip to receive the PWM signal. A first terminal of the first resistor is coupled to a second terminal of the power switch and provides an over current protection (OCP) detection voltage to the control chip. A second terminal of the first resistor is coupled to the first ground terminal. An anode of the first diode is coupled to an opposite-polarity terminal of the secondary winding. A cathode of the first diode is configured to produce and output the DC output voltage. The first capacitor is coupled between the cathode of the first diode and the second ground terminal. An anode of the second diode is coupled to an opposite-polarity terminal of the auxiliary winding. A cathode of the second diode is configured to produce a DC system voltage to the control chip.

In an embodiment of the invention, in the power conversion apparatus, the detection auxiliary circuit includes a second resistor, a third resistor, a third diode, a thermistor, and a fourth resistor. A first terminal of the second resistor is coupled to the opposite-polarity terminal of the auxiliary winding. A second terminal of the second resistor is coupled to the multi-function detection pin. A first terminal of the third resistor is coupled to the multi-function detection pin. A second terminal of the third resistor is coupled to the first ground terminal. A cathode of the third diode is coupled to the multi-function detection pin. A first terminal of the thermistor is coupled to the opposite-polarity terminal of the auxiliary winding. A second terminal of the thermistor is coupled to an anode of the third diode. A first terminal of the fourth resistor is coupled to the anode of the third diode. A second terminal of the fourth resistor is coupled to the first ground terminal.

In an embodiment of the invention, in the power conversion apparatus, the thermistor has a negative temperature coefficient.

In an embodiment of the invention, in the power conversion apparatus, the control chip includes a control main body circuit, an over temperature/over voltage protection circuit, a current detection circuit, a valley voltage detection circuit and an over current protection circuit. The control main body circuit serves as an operation core of the control chip, and generates the PWM signal in response to the power supplying requirement. The over temperature/over voltage protection circuit is coupled between the multi-function detection pin and the control main body circuit, and is configured to perform the detection of the over temperature protection and the detection of the over voltage protection synchronously in the first detection phase, and accordingly provides a first detection result to the control main body circuit. The control main body circuit determines whether to enable an over temperature/over voltage protection mechanism in response to the first detection result. The current detection circuit is coupled between the multi-function detection pin and the control main body circuit, and is configured to detect the input voltage in the second detection phase, and accordingly provides a second detection result to the control main body circuit. The control main body circuit determines whether to enable an input brown-in/brown-out protection mechanism in response to the second detection result. The valley voltage detection circuit is coupled between the multi-function detection pin and the control main body circuit, and is configured to capture the first detection voltage from the detection auxiliary circuit in the first detection phase, and accordingly provides a third detection result. The control main body circuit determines whether to enable the PWM signal in response to the third detection result. The over current protection circuit is coupled between the first terminal of the first resistor and the control main body circuit, and is configured to perform a detection of an over current protection in response to the over current protection detection voltage in the second detection phase, and accordingly provides a fourth detection result to the control main body circuit. The control main body circuit determines whether to enable an over current protection mechanism in response to the fourth detection result. The control main body circuit determines whether to compensate an over current protection point for enabling the over current protection mechanism in response to the second detection result.

In an embodiment of the invention, in the power conversion apparatus, when the over temperature/over voltage protection circuit synchronously performs the detection of the over temperature protection and the detection of the over voltage protection, the over temperature/over voltage protection circuit captures the first detection voltage from the detection auxiliary circuit. The over temperature/over voltage protection circuit compares the first detection voltage with an over temperature/over voltage protection reference voltage, and accordingly generates the first detection result.

In an embodiment of the invention, in the power conversion apparatus, when the control main body circuit determines to enable the over temperature/over voltage protection mechanism in response to the first detection result, the control main body circuit stops outputting the PWM signal until the control main body circuit determines to disable the over temperature/over voltage protection mechanism in response to the first detection result.

In an embodiment of the invention, in the power conversion apparatus, the over temperature/over voltage protection circuit includes a switch and a comparator. A first terminal of the switch is coupled to the multi-function detection pin. A control terminal of the switch receives a first control signal from the control main body circuit. The switch is turned on in response to the first control signal after the control chip enters the first detection phase by a predetermined time. A positive input terminal of the comparator is coupled to a second terminal of the switch, a negative input terminal of the comparator receives an over temperature/over voltage protection reference voltage, and an output terminal of the comparator outputs the first detection result.

In an embodiment of the invention, in the power conversion apparatus, when the third diode is turned off, the first detection voltage is related to the DC output voltage. Now, the over temperature/over voltage protection circuit performs the detection of the over voltage protection according to the first detection voltage, and an actual over voltage protection reference voltage of the over temperature/over voltage protection circuit is the over temperature/over voltage protection reference voltage. On the other hand, when the third diode is turned on, the first detection voltage is related to the DC output voltage and the thermal voltage of the environment temperature. The over temperature/over voltage protection circuit synchronously performs the detection of the over temperature protection and the detection of the over voltage protection according to the first detection voltage. Now, an actual over temperature protection reference voltage of the over temperature/over voltage protection circuit is a sum of the over temperature/over voltage protection reference voltage and a forward bias of the third diode. The actual over voltage protection reference voltage of the over temperature/over voltage protection circuit is lower than the over temperature/over voltage protection reference voltage, and the higher the environment temperature is, the lower the actual over voltage protection reference voltage of the over temperature/over voltage protection circuit is.

In an embodiment of the invention, in the power conversion apparatus, when the control main body circuit determines to enable the input brown-in/brown-out protection mechanism in response to the second detection result, the control main body circuit stops outputting the PWM signal until the control main body circuit determines to disable the input brown-in/brown-out protection mechanism in response to the second detection result.

In an embodiment of the invention, in the power conversion apparatus, the valley voltage detection circuit captures the first detection voltage from the detection auxiliary circuit. The valley voltage detection circuit compares the first detection voltage with a reference valley voltage, and accordingly generates the third detection result. When the first detection voltage is greater than or equal to the reference valley voltage, the control main body circuit maintains the PWM signal to a disable level in response to the third detection result. When the first detection voltage is smaller than the reference valley voltage by a predetermined time, the control main body circuit adjusts the PWM signal from the disable level to an enable level in response to the third detection result. The predetermine time is related to a resonant frequency of the primary winding.

In an embodiment of the invention, in the power conversion apparatus, the valley voltage detection circuit includes a comparator and a delay circuit. A positive input terminal of the comparator receives a reference valley voltage. A negative input terminal of the comparator is coupled to the multi-function detection pin. An output terminal of the comparator generates a comparison signal. The delay circuit is coupled to the output terminal of the comparator to receive the comparison signal, and delays the comparison signal by a predetermined time to output the third detection result.

In an embodiment of the invention, in the power conversion apparatus, when the input voltage corresponds to a relatively high alternating current (AC) input voltage, the over current protection point compensated by the control main body circuit is a first over current protection point. When the input voltage corresponds to a relatively low AC input voltage, the over current protection point compensated by the control main body circuit is a second over current protection point. The first over current protection point is different to the second over current protection point.

In an embodiment of the invention, in the power conversion apparatus, when the control main body circuit determines to enable the over current protection mechanism in response to the fourth detection result, the control main body circuit stops outputting the PWM signal until the control main body circuit determines to disable the over current protection mechanism in response to the fourth detection result.

According to the above descriptions, in the power conversion apparatus of the invention, by sharing the same multi-function detection pin, the control chip synchronously implements a plurality of different control and detection protection functions. Moreover, in the power conversion apparatus of the invention, by sharing the same over voltage protection circuit in the control chip and adding some elements (for example, the thermistor, the resistors and the diodes) in the detection auxiliary circuit, detection and mechanism of over temperature/over voltage protection are synchronously implemented. In this way, not only the single multi-function detection pin corresponds to a plurality of related function detection and control methods, the whole cost of the control chip is also decreased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
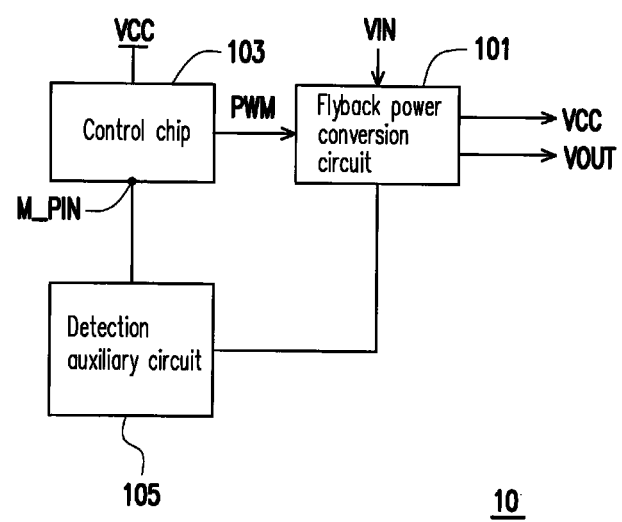
FIG. 1 is a block schematic diagram of a power conversion apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block schematic diagram of a power conversion apparatus according to an embodiment of the invention. Referring to FIG. 1, the power conversion apparatus 10 is a flyback-based power conversion apparatus, which includes a flyback power conversion circuit 101, a control chip 103 and a detection auxiliary circuit 105.

The flyback power conversion circuit 101 receives an input voltage VIN and converts the input voltage VIN in response to a pulse width modulation (PWM) signal PWM come from the control chip, so as to generate and provide a direct current (DC) output voltage VOUT and a DC system voltage VCC.

The control chip 103 is coupled to the flyback power conversion circuit 101, and is operated under the DC system voltage VCC generated by the flyback power conversion circuit 101, and generates the PWM signal PWM to control the operation of the flyback power conversion circuit 101 in response to a power supplying requirement of a certain load (for example, an electronic device).

The detection auxiliary circuit 105 is coupled to the flyback power conversion circuit 101 and a multi-function detection pin of the control chip 103, and assists the control chip 103 to obtain operation state information (for example, the input voltage VIN, the DC output voltage VOUT or an operation temperature, etc.) of the flyback power conversion circuit 101.

Figure 2:
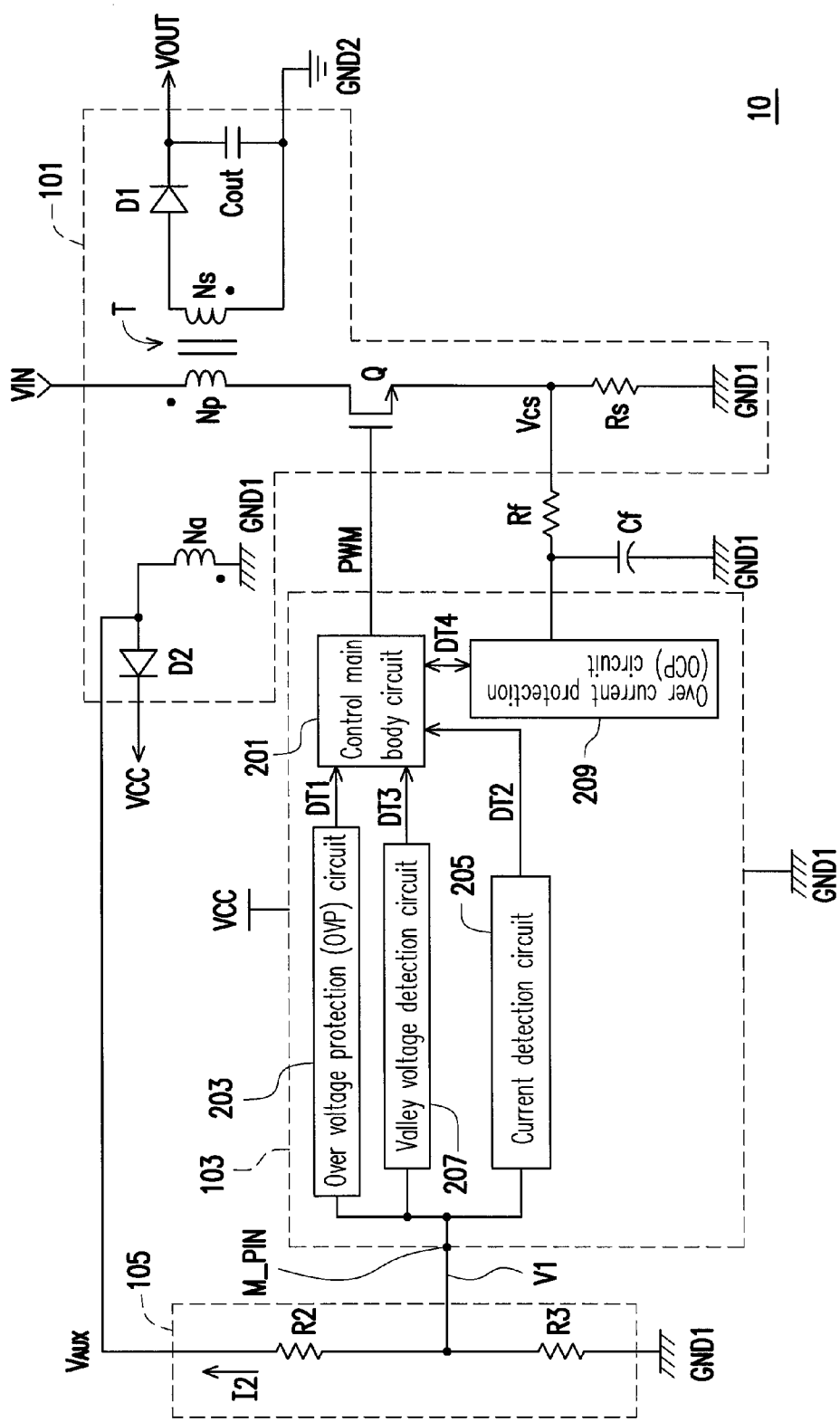
FIG. 2 is a circuit schematic diagram of the power conversion apparatus of FIG. 1.

To be specific, FIG. 2 is a circuit schematic diagram of the power conversion apparatus of FIG. 1. Referring to FIG. 1 and FIG. 2, the flyback power conversion circuit 101 includes a transformer T, a power switch Q (for example, an N-type power switch, and the power switch Q is referred to as the N-type power switch Q hereinafter), a resistor Rs, diodes D1 and D2, and a capacitor Cout.

The transformer T has a primary winding Np, a secondary winding Ns and an auxiliary winding Na, where a common-polarity terminal (i.e. the dotted terminal) of the primary winding Np is configured to receive the input voltage VIN. A common-polarity terminal of the secondary winding Ns of the transformer T is coupled to a second ground terminal GND2. A common-polarity terminal of the auxiliary winding Na of the transformer T is coupled to a first ground terminal GND1. It should be noticed that the first ground terminal GND1 and the second ground terminal GND2 are, for example, different ground surface, though the invention is not limited thereto.

A first terminal of the N-type power switch Q is coupled to an opposite-polarity terminal (i.e. the non-dotted terminal) of the primary winding Np of the transformer T, and a control terminal of the N-type power switch Q receives the PWM signal PWM come from the control chip 103. A first terminal of the resistor Rs is coupled to a second terminal of the N-type power switch Q and provides an over current protection (OCP) detection voltage Vcs to the control chip 103, and a second terminal of the resistor Rs is coupled to the first ground terminal GND1. In an embodiment of the invention, the OCP detection voltage Vcs can be provided to the control chip 103 through a low pass filter composed of a resistor Rf and a capacitor Cf. The resistor Rf is coupled between the first terminal of the resistor Rs and the control chip 103, and the capacitor Cf is coupled between the control chip 103 and the first ground terminal GND1, though the invention is not limited thereto.

An anode of the diode D1 is coupled to an opposite-polarity terminal of the secondary winding Ns of the transformer T, and a cathode of the diode D1 is configured to produce and output the DC output voltage VOUT. A first terminal of the capacitor Cout is coupled to the cathode of the diode D1, and a second terminal of the capacitor Cout is coupled to the second ground terminal GND2. An anode of the diode D2 is coupled to an opposite-polarity terminal of the auxiliary winding Na of the transformer T, and a cathode of the diode D2 is configured to produce the DC system voltage VCC.

On the other hand, the detection auxiliary circuit 105 includes resistors R2 and R3. A first terminal of the resistor R2 is coupled to the opposite-polarity terminal of the auxiliary winding Na of the transformer T, and a second terminal of the resistor R2 is coupled to the multi-function detection pin M_PIN. A first terminal of the resistor R3 is coupled to the multi-function detection pin M_PIN, and a second terminal of the resistor R3 is coupled to the first ground terminal GND1.

In detail, in a normal operation of the power conversion apparatus 10, the control chip 103 generates the PWM signal PWM to control the operation of the flyback power conversion circuit 101 in response to the power supplying requirement of a certain load (an electronic device). In this case, when the N-type power switch Q is turned on in response to the PWM signal PWM generated by the control chip 103, the input voltage VIN is connected across the primary winding Np of the transformer T, and an inductive current of the primary winding Np of the transformer T is linearly increased for storing energy. Meanwhile, as the secondary winding Ns is blocked by a reverse bias of the diode D1, the secondary winding Ns of the transformer T has no current flowing there through. Moreover, as the auxiliary winding Na is blocked by a reverse bias of the diode D2, the auxiliary winding Na of the transformer T also has no current flowing there through.

On the other hand, when the N-type power switch Q is turned off in response to the PWM signal PWM generated by the control chip 103, based on Lenz's law, the energy stored by the primary winding Np of the transformer T is transferred to the secondary winding Ns and the auxiliary winding Na of the transformer T. Meanwhile, since the diode D1 is turned on under a forward bias, the energy transferred to the secondary winding Ns of the transformer T charges the capacitor Cout through the diode D1, and supplies the DC output voltage VOUT to the load (the electronic device). Moreover, the energy transferred to the auxiliary winding Na of the transformer T supplies the DC system voltage VCC to the control chip 103 through the diode D2.

Therefore, by alternately turning on/off the N-type power switch Q through the PWM signal PWM generated by the control chip 103, the power conversion apparatus 10 can continuously supply the DC output voltage VOUT and the DC system voltage VCC.

Besides, the control chip 103 includes a control main body circuit 201, an OVP circuit 203, a current detection circuit 205, a valley voltage detection circuit 207 and an OCP circuit 209. The control main body circuit 201 serves as an operation core of the control chip 103, and generates the PWM signal PWM in response to the power supplying requirement.

Figure 3:
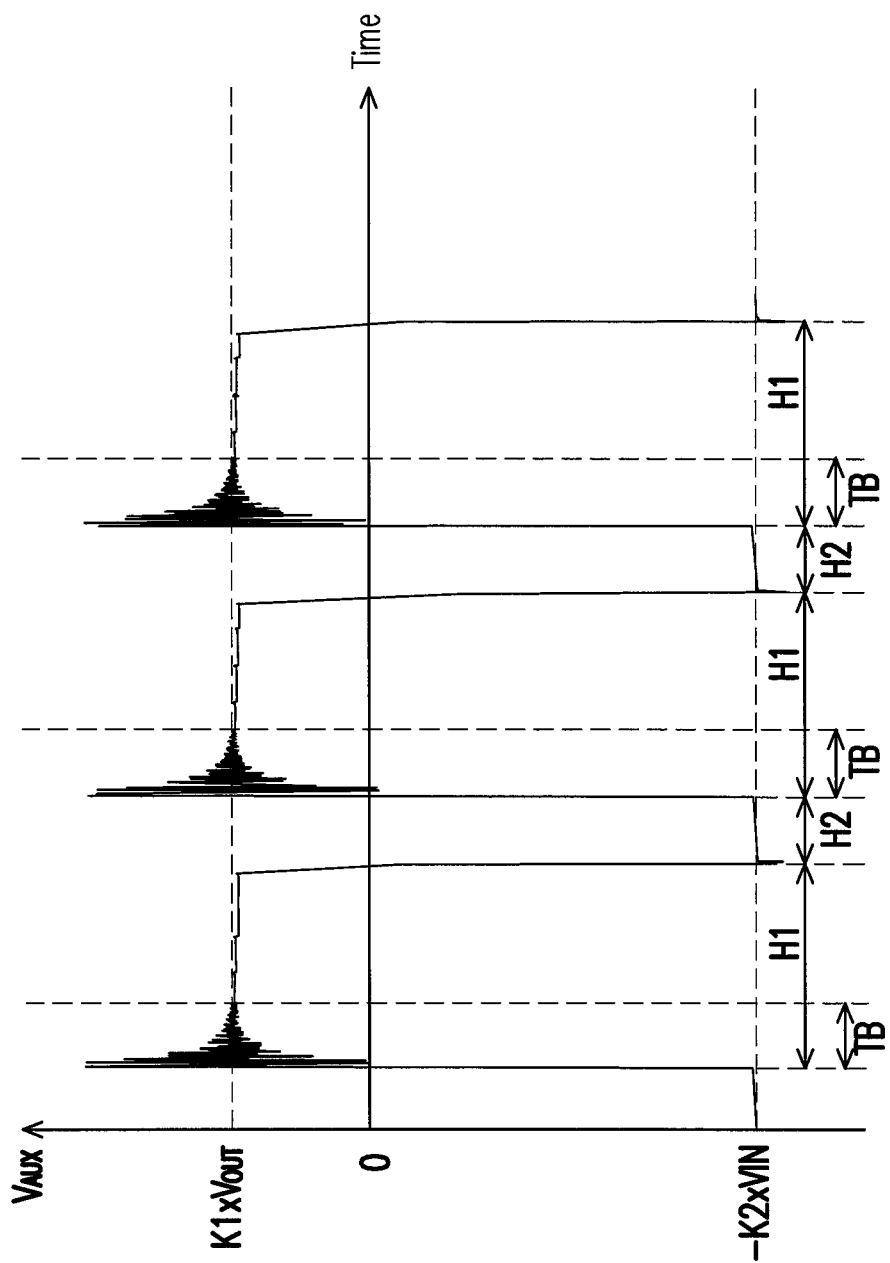
FIG. 3 is a diagram illustrating a relationship between time and a voltage at an opposite-polarity terminal of an auxiliary winding of a transformer.

In the present embodiment, as shown in FIG. 3, FIG. 3 is a diagram illustrating a relationship between time and a voltage (which is referred to as an auxiliary voltage $V_{AUX}$ hereinafter) at the opposite-polarity terminal of the auxiliary winding Na of the transformer T. The OVP circuit 203 and the valley voltage detection circuit 207 are executed/performed in a first detection phase H1. In detail, the first detection phase H1 corresponds to a time period when the N-type power switch Q is turned off. In the first detection phase H1, a stable voltage value of the auxiliary voltage $V_{AUX}$ is K1×VOUT, where K1 is a winding ratio (turns ratio) between the auxiliary winding Na and the secondary winding Ns. Now, the detection auxiliary circuit 105 can divide the auxiliary voltage $V_{AUX}$ to generate a first detection voltage V1 to the multi-function detection pin M_PIN.

The current detection circuit 205 and the OCP circuit 209 are executed/performed in a second detection phase H2. In detail, the second detection phase H2 corresponds to a time period when the N-type power switch Q is turned on. In the second detection phase H2, the stable voltage value of the auxiliary voltage $V_{AUX}$ is −K2×VIN, where K2 is a winding ratio (turns ratio) between the auxiliary winding Na and the primary winding Np. Now, the control chip 103 can maintain a voltage level of the multi-function detection pin M_PIN to a voltage level of the first ground terminal GND1. In this way, a current I2 flows from the current detection circuit 205 to the opposite-polarity terminal of the auxiliary winding Na through the multi-function detection pin M_PIN and the resistor R2. Therefore, the current detection circuit 205 can detect a magnitude of the input voltage VIN by detecting a magnitude of the current I2, so as to implement an input brown-in/brown-out protection mechanism and an OCP mechanism.

Referring to FIG. 1-FIG. 3, the OVP circuit 203 is coupled between the multi-function detection pin M_PIN and the control main body circuit 201, and is configured to perform a detection of the OVP in the first detection phase H1, and accordingly provides a first detection result DT1 to the control main body circuit 201.

When the OVP circuit 203 performs the detection of the OVP, the OVP 203 captures the first detection voltage V1 from the detection auxiliary circuit 105. The OVP 203 compares the first detection voltage V1 with an OVP reference voltage $V_{OVP}$, and generates the first detection result DT1 according to the comparison result.

Figure 4:
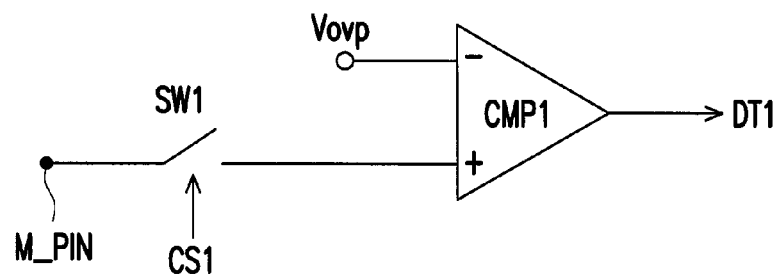
FIG. 4 is a schematic diagram of an over voltage protection (OVP) circuit according to an embodiment of the invention.

To be specific, FIG. 4 is a schematic diagram of the OVP circuit 203 according to an embodiment of the invention. Referring to FIG. 1 to FIG. 4, the OVP circuit 203 includes a switch SW1 and a comparator CMP1. A first terminal of the switch SW1 is coupled to the multi-function detection pin M_PIN to receive the first detection voltage V1. A control terminal of the switch SW1 receives a first control signal CS1 from the control main body circuit 201. A positive input terminal of the comparator CMP1 is coupled to a second terminal of the switch SW1. A negative input terminal of the comparator CMP1 receives the OVP reference voltage $V_{OVP}$. An output terminal of the comparator CMP1 outputs the first detection result DT1. The switch SW1 can be turned on in response to the first control signal CS1 after the control chip 103 enters the first detection phase H1 by a predetermined time TB. In this way, a situation that an overshoot voltage or an undershoot voltage of the first detection voltage V1 causes misjudgement of the OVP circuit 203 at the moment when the control chip 103 just enters the first detection phase H1 (i.e. the moment when the N-type power switch Q is turned off) is avoided.

In the aforementioned embodiment of the invention, the control main body circuit 201 determines whether to enable (activate) the OVP mechanism in response to the first detection result DT1. When the control main body circuit 201 determines to enable the OVP mechanism in response to the first detection result DT1, the control main body circuit 201 stops outputting the PWM signal PWM until the control main body circuit 201 determines to disable (inactivate) the OVP mechanism in response to the first detection result DT1 (i.e. over voltage is not occurred).

The current detection circuit 205 is coupled between the multi-function detection pin M_PIN and the control main body circuit 201, and is configured to detect the input voltage VIN in the second detection phase H2, and accordingly provides a second detection result DT2 to the control main body circuit 201. For example, the current detection circuit 205 can detect a current corresponding to the input voltage VIN ((=90 VAC-264 VAC)×√2) converted from the AC input voltage VAC with a range of 90 VAC-264 VAC, though the invention is not limited thereto. The input voltage VIN can be generated by rectifying and filtering the AC input voltage VAC, though the invention is not limited thereto.

In the aforementioned embodiments of the invention, the control main body circuit 201 determines whether to enable an input brown-in/brown-out protection mechanism in response to the second detection result DT2. When the control main body circuit 201 determines to enable the input brown-in/brown-out protection mechanism in response to the second detection result DT2, the control main body circuit 201 stops outputting the PWM signal PWM until the control main body circuit 201 determines to disable the input brown-in/brown-out protection mechanism in response to the second detection result DT2 (i.e. the input voltage is input brown-in or input voltage brown-out is not occurred).

For example, when the power conversion apparatus 10 is activated, the control main body circuit 201 can output the PWM signal PWM to turn on the N-type power switch Q, and meanwhile maintains the voltage level of the multi-function detection pin M_PIN to the voltage level of the first ground terminal GND1. As described above, in the second detection phase H2, the stable voltage value of the auxiliary voltage $V_{AUX}$ is $-K2 \times VIN$. In this way, the current I2 flows from the current detection circuit 205 to the opposite-polarity terminal of the auxiliary winding Na through the multi-function detection pin M_PIN and the resistor R2 (i.e. the auxiliary voltage $V_{AUX}$). Now, the current I2 is $K2 \times VIN \div R2$. Therefore, the current detection circuit 205 can detect a magnitude of the input voltage VIN by detecting a magnitude of the current I2 and generate the second detection result DT2. The control main body circuit 201 determines whether the input voltage VIN is input brown-in according to the second detecting result DT2. If it is determined that the input voltage VIN is input brown-in, the power conversion apparatus 10 enters a normal operation mode. Otherwise, the control main body circuit 201 stops outputting the PWM signal PWM to enable the input brown-in protection mechanism, and waits for determination of the next input brown-in.

When it is determined that the input voltage VIN is input brown-in, and the power conversion apparatus 10 has entered the normal operation mode, the current detection circuit 205 can detect whether the input voltage VIN is changed by detecting a magnitude of the current I2 and generate the second detection result DT2 in the subsequent second detection phase H2. The control main body circuit 201 determines whether the input voltage VIN is decreased to be under a safe voltage level according to the second detection result DT2. If the determination result is affirmative, or if several consecutive determination results are affirmative, it represents that the input voltage VIN is input brown-out, and the control main body circuit 201 can stop outputting the PWM signal PWM to enable the input brown-out protection mechanism.

The valley voltage detection circuit 207 is coupled between the multi-function detection pin M_PIN and the control main body circuit 201, and is configured to capture the first detection voltage V1 from the detection auxiliary circuit 105 in the first detection phase H1, and accordingly provides a third detection result DT3 to the control main body circuit 201. The control main body circuit 201 further determines whether to enable the PWM signal PWM in response to the third detection result DT3, so as to turn on or turn off the N-type power switch Q.

The valley voltage detection circuit 207 can capture the first detection voltage V1 from the detection auxiliary circuit 105. The valley voltage detection circuit 207 compares the first detection voltage V1 with a reference valley voltage $V_{VALLEY}$, and generates the third detection result DT3 according to the comparison result. When the first detection voltage V1 is greater than or equal to the reference valley voltage $V_{VALLEY}$, the control main body circuit 201 maintains the PWM signal PWM to a disable level in response to the third detection result DT3. When the first detection voltage V1 is smaller than the reference valley voltage $V_{VALLEY}$ by a predetermined time $T_{VALLEY}$, the control main body circuit 201 adjusts the PWM signal PWM from the disable level to an enable level in response to the third detection result DT3, so as to turn on the N-type power switch Q. The predetermine time $T_{VALLEY}$ is related to a resonant frequency of the primary winding Np.

Figure 5:
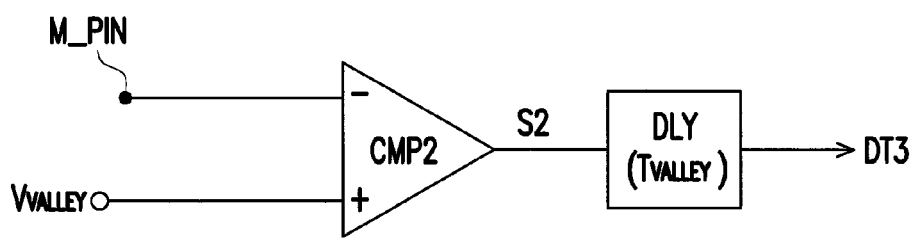
FIG. 5 is a schematic diagram of a valley voltage detection circuit according to an embodiment of the invention.

In detail, FIG. 5 is a schematic diagram of the valley voltage detection circuit 207 according to an embodiment of the invention. The valley voltage detection circuit 207 includes a comparator CMP2 and a delay circuit DLY. A positive input terminal of the comparator CMP2 receives the reference valley voltage $V_{VALLEY}$. A negative input terminal of the comparator CMP2 is coupled to the multi-function detection pin M_PIN. An output terminal of the comparator CMP2 generates a comparison signal S2. The delay circuit DLY is coupled to the output terminal of the comparator CMP2 to receive the comparison signal S2, and delays the comparison signal S2 by the predetermined time $T_{VALLEY}$ to output the third detection result DT3.

Further, in the first detection phase H1 (i.e. when the N-type power switch Q is turned off), after transferring of the energy stored by the primary winding Np of the transformer T is completed, the N-type power switch Q can be again turned on to store energy to the primary winding Np (i.e. to enter the second detection phase H2). However, since after transferring of the energy stored by the primary winding Np of the transformer T is completed, a parasitic capacitance of the primary winding Np and the power switch Q and an inductance in the primary winding Np start to produce resonance, and a generated resonance signal forms a peak and a valley at the first terminal of the N-type power switch Q. In this case, if the N-type power switch Q can be turned on when the resonance signal is in the valley (i.e. a trough of the resonance signal), a switching loss thereof is reduced, and efficiency of the power conversion apparatus 10 is improved. The resonance signal at the primary winding Np can also be transferred to the auxiliary winding Na, and reflects on the first detection voltage V1 through the detection auxiliary circuit 105.

Since the common-polarity terminal of the auxiliary winding Na is coupled to the first ground terminal GND1, in the resonance signal reflected to the first detection voltage V1, the signal with a level lower than the first ground terminal GND1 is clamped to the level of the first ground terminal GND1. In this way, the valley voltage detection circuit 207 can only determine that the resonance signal is about to be decreased to the valley when the first detection voltage V1 is lower than the reference valley voltage $V_{VALLEY}$, and cannot determine the real valley. However, since a time when the valley of the resonance signal appears is related to a resonance frequency (or a period), and the resonance frequency of the resonance signal can be learned according to the parasitic capacitance of the primary winding Np and the N-type power switch Q and the inductance of the primary winding Np, the valley voltage detection circuit 207 can calculate the time when the valley of the resonance signal appears according to the resonance frequency, and takes such time as the predetermined time $T_{VALLEY}$. In this way, the valley voltage detection circuit 207 can detect the time when the valley of the resonance signal appears and generate the third detection result DT3. The control main body circuit 201 can turn on the N-type power switch Q according to the third detection result DT3 when the valley of the resonance signal appears.

On the other hand, the OCP circuit 209 is coupled between the first terminal of the resistor Rs and the control main body circuit 201. The OCP 209 is configured to perform a detection of an over current protection (OCP) in response to the OCP detection voltage Vcs crossing the resistor Rs in the second detection phase H2, and accordingly provides a fourth detection result DT4 to the control main body circuit 201. In the present exemplary embodiment, the control main body circuit 201 determines whether to enable an OCP mechanism in response to the fourth detection result DT4 provided by the OCP circuit 209. Once the control main body circuit 201 determines to enable the OCP mechanism in response to the fourth detection result DT4 provided by the OCP circuit 209, the control main body circuit 201 stops outputting the PWM signal PWM until the control main body circuit 201 determines to disable the OCP mechanism in response to the fourth detection result DT4 provided by the OCP circuit 209 (i.e. over current is not occurred).

Moreover, since OCP points of the OCP mechanism corresponding to different AC input voltages with the range of 90 VAC-264 VAC are different, in the present exemplary embodiment, the control main body circuit 201 can further determine whether to compensate the OCP point used for enabling the OCP mechanism in response to the second detection result DT2 that is related to a variation of the input voltage VIN and provided by the current detection circuit 205.

In detail, when the input voltage VIN(=VAC*$\sqrt{2}$) corresponds to a relatively high AC input voltage VAC, for example, the AC input voltage VAC of 264 VAC, the OCP point compensated by the control main body circuit 201 can be a first OCP point. Moreover, when the input voltage VIN corresponds to a relatively low AC input voltage VAC, for example, the AC input voltage VAC of 90 VAC, the OCP point compensated by the control main body circuit 201 can be a second OCP point. The first OCP point is different to the second OCP point. In this way, the OCP circuit 209 can be adapted to different AC input voltages VAC to adjust the OCP mechanism, so as to reach accurate OCP points of the whole range 90 VAC-264 VAC.

Figure 6:
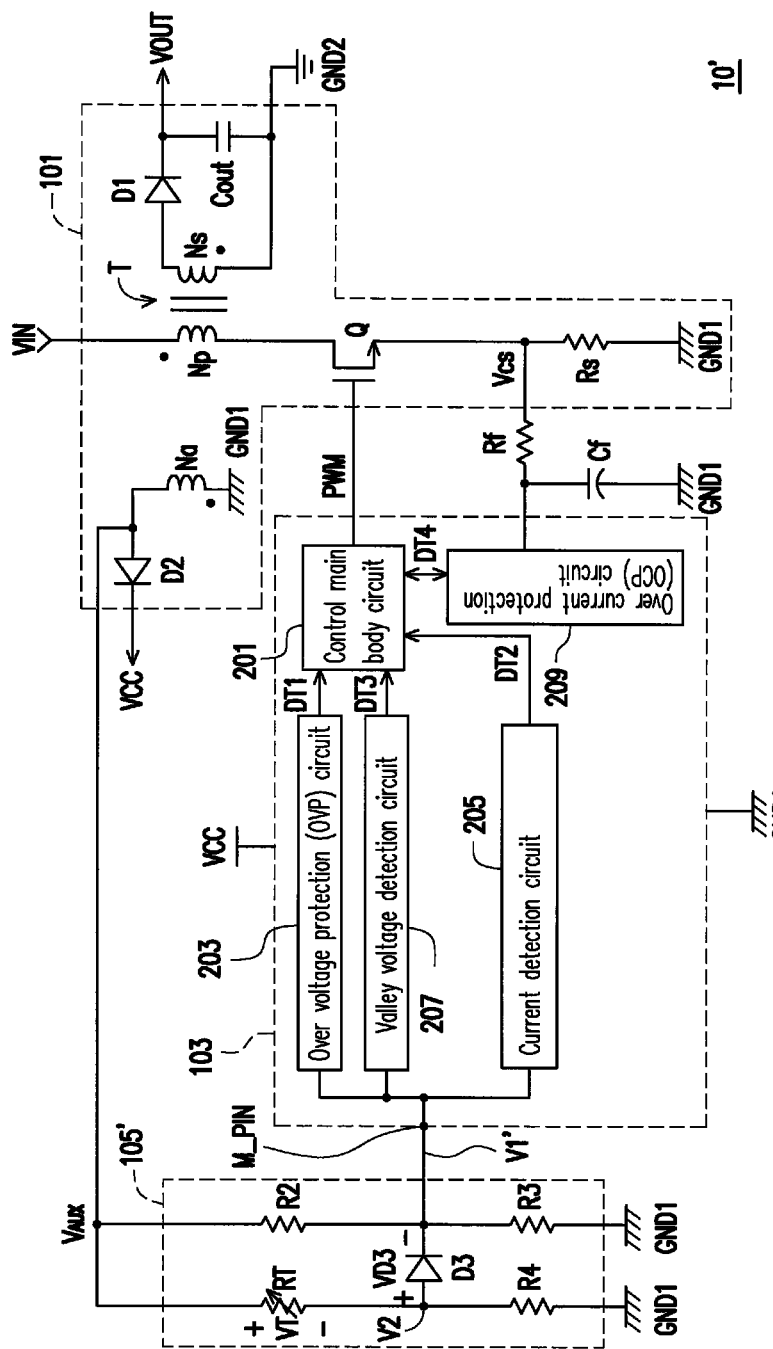
FIG. 6 is a schematic diagram of another circuit structure of the power conversion apparatus of FIG. 1.

Besides, FIG. 6 is a schematic diagram of another circuit structure of the power conversion apparatus of FIG. 1. Referring to FIG. 2, FIG. 3 and FIG. 6, the power conversion apparatus 10' of FIG. 6 is similar to the power conversion apparatus 10 of FIG. 2, and a difference there between is that the detection auxiliary circuit 105' of the power conversion apparatus 10' of FIG. 6 further includes a detection circuit of an over temperature protection (OTP). Therefore, the operation methods of the flyback power conversion circuit 101 and the control chip 103 may refer to related descriptions of FIG. 2-FIG. 5, and details thereof are not repeated.

Further, the detection auxiliary circuit 105' of the power conversion apparatus 10' of FIG. 6 can assist the control chip 103 to obtain the first detection voltage V1' through the multi-function detection pin M_PIN in the first detection phase H1, so as to synchronously perform a detection of the OTP and a detection of the OVP according to the first detection voltage V1'. The first detection voltage V1' is related to the DC output voltage VOUT or a thermal voltage VT of the environment temperature. Namely, besides that the OVP circuit 203 of FIG. 6 can perform the detection of the OVP, it can synchronously perform the detection of the OTP. Therefore, the OVP circuit 203 of FIG. 6 can be substantially regarded as an OTP/OVP circuit (so that the OVP circuit 203 is referred to as the OTP/OVP circuit 203 hereinafter), and the OVP reference voltage $V_{OVP}$ can be regarded as an OTP/OVP reference voltage (so that the OVP reference voltage $V_{OVP}$ is referred to as the OTP/OVP reference voltage $V_{OVP}$ hereinafter). In fact, implementation of the OTP/OVP circuit 203 of FIG. 6 is the same to the OVP circuit 203 of FIG. 2 and FIG. 4. Therefore, a circuit space used for building another OTP circuit in the control chip 103 is saved, so as to reduce a circuit cost of the control chip 103.

The OTP/OVP circuit 203 is configured to perform the detection of the OTP and the detection of the OVP synchronously in the first detection phase H1, and accordingly provides the first detection result DT1 to the control main body circuit 201. The control main body circuit 201 determines whether to enable an OTP/OVP mechanism in response to the first detection result DT1.

To be specific, when the OTP/OVP circuit 203 synchronously performs the detection of the OTP and the detection of the OVP, the OTP/OVP circuit 203 captures the first detection voltage V1' from the detection auxiliary circuit 105'. The OTP/OVP circuit 203 compares the first detection voltage V1 with the OTP/OVP reference voltage $V_{OVP}$, and accordingly generates the first detection result DT1.

In the present embodiment of the invention, the control main body circuit 201 determines whether to enable the OTP/OVP mechanism in response to the first detection result DT1. When the control main body circuit 201 determines to enable the OTP/OVP mechanism in response to the first detection result DT1, the control main body circuit 201 stops outputting the PWM signal PWM until the control main body circuit 201 determines to disable the OTP/OVP mechanism in response to the first detection result DT1 (i.e. no over temperature/over voltage is occurred).

The detection auxiliary circuit 105' is described below. The detection auxiliary circuit 105' includes a diode D3, resistors R2-R4 and a thermistor RT. A first terminal of the resistor R2 is coupled to the opposite-polarity terminal of the auxiliary winding Na. A second terminal of the resistor R2 is coupled to the multi-function detection pin M_PIN. A first terminal of the resistor R3 is coupled to the multi-function detection pin M_PIN. A second terminal of the resistor R3 is coupled to the first ground terminal GND1. A cathode of the diode D3 is coupled to the multi-function detection pin M_PIN. A first terminal of the thermistor RT is coupled to the opposite-polarity terminal of the auxiliary winding Na. A second terminal of the thermistor RT is coupled to an anode of the diode D3. A first terminal of the resistor R4 is coupled to the anode of the diode D3. A second terminal of the resistor R4 is coupled to the first ground terminal GND1. In the present exemplary embodiment, the thermistor RT can be a thermistor having a negative temperature coefficient (NTC).

Functions of the resistors R2 and R3 in the detection auxiliary circuit 105' of FIG. 6 are similar to that of the resistors R2 and R3 in the detection auxiliary circuit 105 of FIG. 2, so that descriptions thereof may refer to the aforementioned descriptions, and details thereof are not repeated. On the other hand, the diode D3, the resistor R4 and the thermistor RT in the detection auxiliary circuit 105' can be used to assist the detection of the OTP.

In the first detection phase H1, when the temperature rises, an impedance of the thermistor RT is decreased, such that the thermal voltage VT at two ends of the thermistor RT is decreased, and a voltage at the anode of the diode D3 (which is referred to as a second detection voltage V2 hereinafter) is accordingly increased. In this case, if a voltage difference between the second detection voltage V2 and the first detection voltage V1' is smaller than a forward bias VD3 of the diode D3, the diode D3 is turned off, and the OTP/OVP circuit 203 obtains the first detection voltage V1' through the multi-function detection pin M_PIN, and performs the detection of the OVP according to the first detection voltage V1'. Now, the actual OVP reference voltage of the OTP/OVT circuit 203 is the OTP/OVP reference voltage $V_{OVP}$.

If the voltage difference between the second detection voltage V2 and the first detection voltage V1' is greater than or equal to the forward bias VD3 of the diode D3, the diode D3 is turned on. Now the first detection voltage V1' is a difference between the second detection voltage V2 and the forward bias VD3 of the diode D3 (i.e. V1'=V2−VD3, and V2=$V_{AUX}$−VT). In other words, the first detection voltage V1' is now related to the DC output voltage VOUT or the thermal voltage VT of the environment temperature. Therefore, the OTP/OVP circuit 203 obtains the first detection voltage V1' through the multi-function detection pin M_PIN, and performs the detection of the OTP and the detection of the OVP synchronously according to the first detection voltage V1'. Since the forward bias VD3 of the diode D3 exists, the actual OTP reference voltage of the OTP/OVP circuit 203 can be regarded as a sum of the OTP/OVP reference voltage $V_{OVP}$ and the forward bias VD3 of the diode D3. Namely, when the second detection voltage V2 is greater than or equal to the sum of the OTP/OVP reference voltage $V_{OVP}$ and the forward bias VD3 of the diode D3, the control main body circuit 201 can enable the OTP/OVP mechanism and stop outputting the PWM signal PWM.

Besides, in the present embodiment, if the voltage difference between the second detection voltage V2 and the first detection voltage V1' is greater than the forward bias VD3 of the diode D3 (i.e. the diode D3 is turned on) and the second detection voltage V2 is smaller than the sum of the OTP/OVP reference voltage $V_{OVP}$ and the forward bias VD3 of the diode D3, the first detection voltage V' is related to the DC output voltage VOUT and the thermal voltage VT of the environment temperature, and the first detection voltage V1' is not only a detection result obtained by using the second resistor R2 and the third resistor R3 to divide the auxiliary voltage $V_{AUX}$. This is because that as the diode D3 is turned on, a current may flow from the auxiliary voltage $V_{AUX}$ to the resistor R3 through the thermal resistor RT and the diode D3. In this way, the voltage level of the first detection voltage V1' is pulled up.

The higher the temperature is, the lower the impedance of the thermal resistor RT is, and the higher the voltage level of the first detection voltage V1' is, and the more the voltage level of the first detection voltage V1' is close to the OTP/OVP reference voltage $V_{OVP}$. In this case, since the temperature increase causes increase of the voltage level of the first detection voltage V1', an actual OVP reference voltage value of the OTP/OVP circuit 203 for performing the OVP is decreased. In other words, the actual OVP reference voltage value of the OTP/OVP circuit 203 for performing the OVP is lower than the OTP/OVP reference voltage $V_{OVP}$. Namely, the actual OVP reference voltage value of the OTP/OVP circuit 203 after the diode D3 is turned on is lower than the OVP reference voltage value when the diode D3 is turned off. Namely, when the diode D3 is turned on, the detection auxiliary circuit 105' may change the actual OVP reference voltage value of the OTP/OVP circuit 203 according to a variation of the external environment temperature. The higher the environment temperature is, the lower the actual OVP reference voltage value of the OTP/OVP circuit 203 is.

Besides, in the present embodiment, the resistor R4 can be fine tuned according to an actual protection temperature. In this way, the detection auxiliary circuit 105' can perform OTP for different temperatures according to an actual application or design requirement. For example, when the actual protection temperature of the OTP is adjusted from 100 Celsius degrees to 90 Celsius degrees, under a premise that the thermal resistor RT is not substituted, it is only required to fine tune the resistor R4 to achieve an effect of changing the actual protection temperature, though the invention is not limited thereto. In other embodiments of the invention, another resistor can be connected in series between the thermal resistor RT and the resistor R4 to adjust the temperature of the OTP.

On the other hand, since the diode D3 is coupled between two voltage-dividing circuits (i.e. a voltage-dividing circuit composed of the thermal resistor RT and the resistor R4 and a voltage-dividing circuit composed of the resistor R2 and the resistor R3), the diode D3 is avoided to be implemented by a high voltage component.

In summary, in the power conversion apparatus of the invention, by sharing the same multi-function detection pin, the control chip synchronously implements a plurality of different control and detection protection functions. Moreover, in the power conversion apparatus of the invention, by sharing the same OVP circuit in the control chip and adding some elements (for example, the thermistor, the resistors and the diodes) in the detection auxiliary circuit, detection and mechanism of OTP/OVP are synchronously implemented. In this way, not only the single multi-function detection pin corresponds to a plurality of related function detection and control methods, the whole cost of the control chip is also decreased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A power conversion apparatus, comprising:
a flyback power conversion circuit, receiving an input voltage and converting the input voltage in response to a pulse width modulation signal, so as to generate and provide a DC output voltage;
a control chip, coupled to the flyback power conversion circuit, and generating the pulse width modulation signal to control the operation of the flyback power conversion circuit in response to a power supplying requirement, wherein the control chip has a multi-function detection pin; and
a detection auxiliary circuit, coupled to the flyback power conversion circuit and the multi-function detection pin of the control chip,
wherein the detection auxiliary circuit assists the control chip to obtain a first detection voltage through the multi-function detection pin in a first detection phase, so as to perform a detection of an over temperature protection and a detection of an over voltage protection synchronously according to the first detection voltage,
wherein the first detection voltage is related to the DC output voltage or a thermal voltage of an environment temperature, wherein the control chip further captures the first detection voltage from the detection auxiliary circuit in the first detection phase, and accordingly providing a valley voltage detection result, wherein the control chip determines whether to enable the pulse width modulation signal in response to the valley voltage detection result.

2. The power conversion apparatus as claimed in claim 1, wherein the control chip enters the first detection phase during a disable period of the pulse width modulation signal, and enters a second detection phase during an enable period of the pulse width modulation signal.

3. The power conversion apparatus as claimed in claim 2, wherein the flyback power conversion circuit comprises:
  a transformer, having a primary winding, a secondary winding and an auxiliary winding, wherein a common-polarity terminal of the primary winding is configured to receive the input voltage, a common-polarity terminal of the auxiliary winding is coupled to a first ground terminal, and a common-polarity terminal of the secondary winding is coupled to a second ground terminal;
  a power switch, having a first terminal coupled to an opposite-polarity terminal of the primary winding, and a control terminal coupled to the control chip to receive the pulse width modulation signal;
  a first resistor, having a first terminal coupled to a second terminal of the power switch and providing an over current protection detection voltage to the control chip, and a second terminal coupled to the first ground terminal;
  a first diode, having an anode coupled to an opposite-polarity terminal of the secondary winding, and a cathode configured to produce and output the DC output voltage;
  a first capacitor, coupled between the cathode of the first diode and the second ground terminal; and
  a second diode, having an anode coupled to an opposite-polarity terminal of the auxiliary winding, and a cathode configured to produce a DC system voltage to the control chip.

4. The power conversion apparatus as claimed in claim 3, wherein the detection auxiliary circuit comprises:
  a second resistor, having a first terminal coupled to the opposite-polarity terminal of the auxiliary winding, and a second terminal coupled to the multi-function detection pin;
  a third resistor, having a first terminal coupled to the multi-function detection pin, and a second terminal coupled to the first ground terminal;
  a third diode, having a cathode coupled to the multi-function detection pin;
  a thermistor, having a first terminal coupled to the opposite-polarity terminal of the auxiliary winding, and a second terminal coupled to an anode of the third diode; and
  a fourth resistor, having a first terminal coupled to the anode of the third diode, and a second terminal coupled to the first ground terminal.

5. The power conversion apparatus as claimed in claim 4, wherein the thermistor has a negative temperature coefficient.

6. The power conversion apparatus as claimed in claim 4, wherein the control chip comprises:
  a control main body circuit, serving as an operation core of the control chip, and generating the pulse width modulation signal in response to the power supplying requirement;
  an over temperature/over voltage protection circuit, coupled between the multi-function detection pin and the control main body circuit, configured to perform the detection of the over temperature protection and the detection of the over voltage protection synchronously in the first detection phase, and accordingly providing a first detection result to the control main body circuit, wherein the control main body circuit determines whether to enable an over temperature/over voltage protection mechanism in response to the first detection result;
  a current detection circuit, coupled between the multi-function detection pin and the control main body circuit, configured to detect the input voltage in the second detection phase, and accordingly providing a second detection result to the control main body circuit, wherein the control main body circuit determines whether to enable an input brown-in/brown-out protection mechanism in response to the second detection result;
  a valley voltage detection circuit, coupled between the multi-function detection pin and the control main body circuit, configured to capture the first detection voltage from the detection auxiliary circuit in the first detection phase, and accordingly providing a third detection result to serve as the valley voltage detection result, wherein the control main body circuit determines whether to enable the pulse width modulation signal in response to the third detection result; and
  an over current protection circuit, coupled between the first terminal of the first resistor and the control main body circuit, configured to perform a detection of an over current protection in response to the over current protection detection voltage in the second detection phase, and accordingly providing a fourth detection result to the control main body circuit, wherein the control main body circuit determines whether to enable an over current protection mechanism in response to the fourth detection result,
  wherein the control main body circuit determines whether to compensate an over current protection point for enabling the over current protection mechanism in response to the second detection result.

7. The power conversion apparatus as claimed in claim 6, wherein when the over temperature/over voltage protection circuit synchronously performs the detection of the over temperature protection and the detection of the over voltage protection, the over temperature/over voltage protection circuit captures the first detection voltage from the detection auxiliary circuit, wherein the over temperature/over voltage protection circuit compares the first detection voltage with an over temperature/over voltage protection reference voltage, and accordingly generates the first detection result.

8. The power conversion apparatus as claimed in claim 7, wherein when the control main body circuit determines to enable the over temperature/over voltage protection mechanism in response to the first detection result, the control main body circuit stops outputting the pulse width modulation signal until the control main body circuit determines to disable the over temperature/over voltage protection mechanism in response to the first detection result.

9. The power conversion apparatus as claimed in claim 6, wherein the over temperature/over voltage protection circuit comprises:
  a switch, having a first terminal coupled to the multi-function detection pin, and a control terminal receiving a first control signal from the control main body circuit, wherein the switch is turned on in response to the first control signal after the control chip enters the first detection phase by a predetermined time; and a comparator, having a positive input terminal coupled to a second terminal of the switch, a negative input terminal receiving an over temperature/over voltage protection reference voltage, and an output terminal outputting the first detection result.

10. The power conversion apparatus as claimed in claim 9, wherein when the third diode is turned off, the first detection voltage is related to the DC output voltage, the over temperature/over voltage protection circuit performs the detection of the over voltage protection according to the first detection voltage, and an actual over voltage protection reference voltage of the over temperature/over voltage protection circuit is the over temperature/over voltage protection reference voltage; and when the third diode is turned on, the first detection voltage is related to the DC output voltage and the thermal voltage of the environment temperature, the over temperature/over voltage protection circuit synchronously performs the detection of the over temperature protection and the detection of the over voltage protection according to the first detection voltage, wherein an actual over temperature protection reference voltage of the over temperature/over voltage protection circuit is a sum of the over temperature/over voltage protection reference voltage and a forward bias of the third diode, and the actual over voltage protection reference voltage of the over temperature/over voltage protection circuit is lower than the over temperature/over voltage protection reference voltage, and the higher the environment temperature is, the lower the actual over voltage protection reference voltage of the over temperature/over voltage protection circuit is.

11. The power conversion apparatus as claimed in claim 6, wherein when the control main body circuit deter wines to enable the input brown-in/brown-out protection mechanism in response to the second detection result, the control main body circuit stops outputting the pulse width modulation signal until the control main body circuit determines to disable the input brown-in/brown-out protection mechanism in response to the second detection result.

12. The power conversion apparatus as claimed in claim 6, wherein the valley voltage detection circuit captures the first detection voltage from the detection auxiliary circuit, compares the first detection voltage with a reference valley voltage, and accordingly generates the third detection result, when the first detection voltage is greater than or equal to the reference valley voltage, the control main body circuit maintains the pulse width modulation signal to a disable level in response to the third detection result, and when the first detection voltage is smaller than the reference valley voltage by a predetermined time, the control main body circuit adjusts the pulse width modulation signal from the disable level to an enable level in response to the third detection result, wherein the predetermine time is related to a resonant frequency of the primary winding.

13. The power conversion apparatus as claimed in claim 6, wherein the valley voltage detection circuit comprises:

a comparator, having a positive input terminal receiving a reference valley voltage, a negative input terminal coupled to the multi-function detection pin, and an output terminal generating a comparison signal; and a delay circuit, coupled to the output terminal of the comparator to receive the comparison signal, and delaying the comparison signal by a predetermined time to output the third detection result.

14. The power conversion apparatus as claimed in claim 6, wherein when the input voltage corresponds to a relatively high alternating current (AC) input voltage, the over current protection point compensated by the control main body circuit is a first over current protection point;

when the input voltage corresponds to a relatively low AC input voltage, the over current protection point compensated by the control main body circuit is a second over current protection point; and the first over current protection point is different to the second over current protection point.

15. The power conversion apparatus as claimed in claim 14, wherein when the control main body circuit determines to enable the over current protection mechanism in response to the fourth detection result, the control main body circuit stops outputting the pulse width modulation signal until the control main body circuit determines to disable the over current protection mechanism in response to the fourth detection result.

* * * * *